Feb. 20, 1962   G. H. ROBINSON ET AL   3,022,407
METHOD OF JOINING CAST IRON TO STEEL
Filed Nov. 29, 1957
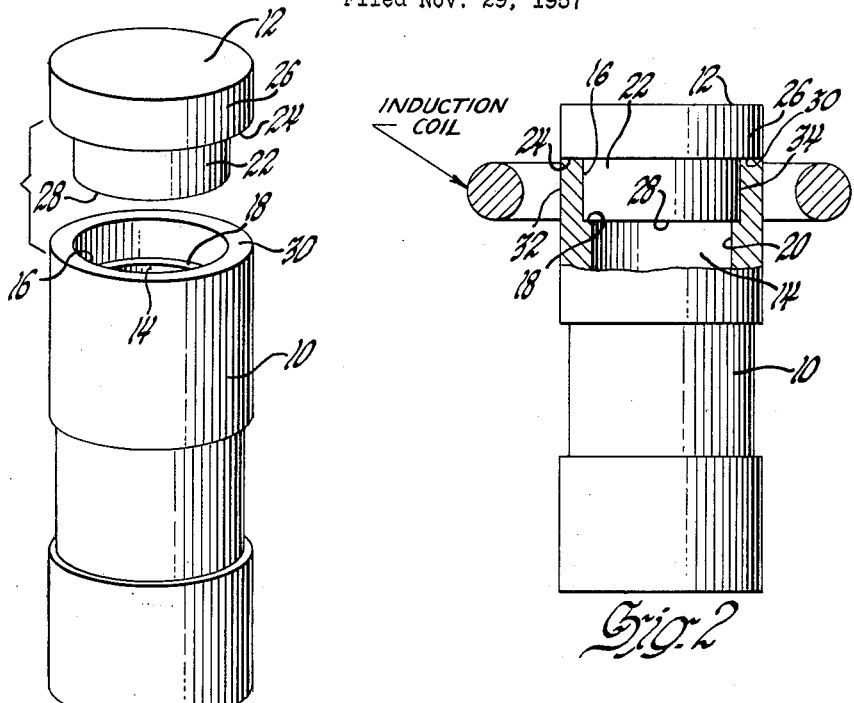
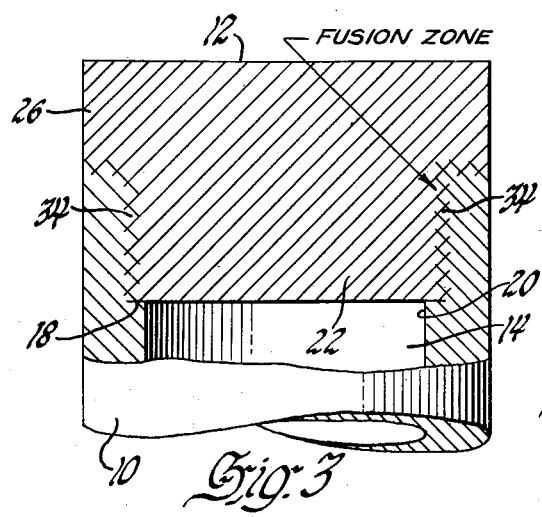
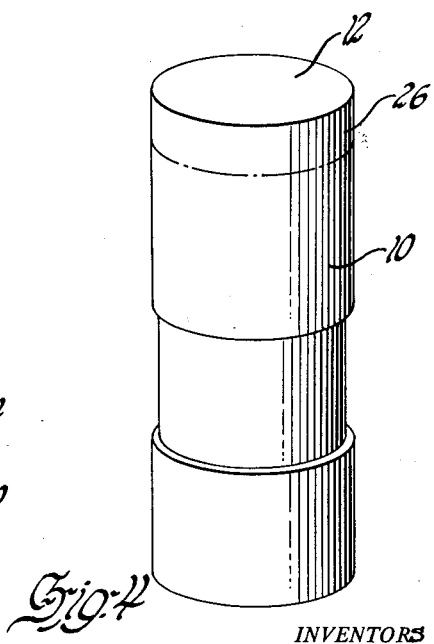
INVENTORS
George H. Robinson, &
BY Eugene G. Ross
ATTORNEY United States Patent Office 3,022,407
Patented Feb. 20, 1962

3,022,407
METHOD OF JOINING CAST IRON TO STEEL
George H. Robinson, St. Clair Shores, and Eugene G. Ross, Royal Oak, Mich., assignors to General Motors Corporation, Detroit, Mich., a corporation of Delaware
Filed Nov. 29, 1957, Ser. No. 699,670
3 Claims. (Cl. 219—9.5)

This invention relates to a method of making a composite metal article and is more particularly concerned with a method of joining cast iron to steel such as can be used in the manufacture of a composite valve lifter body and similar articles.

In a valve lifter it is highly advantageous, if not essential, that the foot portion which engages the cam or other operated member be formed of a hard, wear-resistant material. By means of the present invention the foot member, if desired, can be made of a material that is hard and wear resistant, such as alloy cast iron. The remainder of the valve lifter or like body can be made of inexpensive metal, such as steel tubing.

Among the objects of this invention are the following: to provide a method for joining two metals, one of which has a lower melting point than the other, in such a manner that the lower melting point metal is melted only at the interface of the bonding area; to provide an improved method of forming composite articles such as valve lifter bodies and similar articles; to provide a method of forming composite valve lifter bodies and related articles having a foot material of superior wear resistance; and to provide a method of forming composite valve lifter bodies by bonding a cast iron foot and a steel tubular body by conductively heating substantially only the bonding interface of the cast iron foot to its melting point.

Briefly, the invention comprehends bonding two metallurgically compatible metal parts together by placing the parts in abutment and directly preferentially heating the metal part having the higher melting point. The heating of the higher melting point metal is continued for a sufficient period of time so that enough heat is conducted to the bonding surface to raise the temperature of this surface to about the melting point of the lower melting point metal. In this manner, for example, a cast iron foot member of a composite valve lifter body can be liquefied at its junction to a steel tubular body member while the remainder of the cast iron foot member remains substantially in the solid state. Since molten cast iron is metallurgically compatible with steel, it wets and diffuses into the surface of the steel member, thus forming a diffusion alloy layer at the joining interface and bonding the two together.

Other objects, features and advantages of the present invention will become more apparent from the following description of a preferred embodiment thereof and from the drawing, in which:

FIGURE 1 is an exploded perspective view of a composite valve lifter body showing a tubular body and separate foot member;

FIGURE 2 is an elevational view in partial section showing a tubular valve lifter body and foot member in structural relationship placed within an induction coil heater;

FIGURE 3 is an enlarged fragmentary elevational view with parts in section, showing the diffusion zone at the bonding interface of a bonded foot member and a valve lifter body; and FIGURE 4 is a perspective view of a bonded composite valve lifter body.

Referring now to the drawing, FIGURES 1 and 2 show a composite valve lifter having an inexpensive tubular steel body 10 and a cast iron end piece or foot member 12. The tubular steel body is an annular cylinder having a uniform central bore 14 and an enlarged bore 16 adjacent the foot end. An annular shoulder 18 is formed on the inner wall 20 of the cylinder at the junction of the two bores 14 and 16. The cast iron foot member 12 is a cylindrical cast iron cap having a diameter generally similar to the outer diameter of the tubular steel body 10. A portion 22 of the cylindrical cap adjacent one end is of a reduced diameter which is slightly smaller than the enlarged bore 16 of the tubular body 10. An annular shoulder 24 is formed around the outer cylindrical periphery of the cap at the junction of the diametrically smaller part 22 with the larger part 26. The diametrically smaller part of the end cap is inserted within the enlarged bore of the tubular body in close fitting relationship. The length of the diametrically smaller portion 22 of the end cap 12 is approximately equal to the longitudinal extension of the enlarged bore 16 of the tubular body 10. Thus, as shown in FIGURES 2 and 3, when the foot member or cap 12 is in structural relationship with the tubular body 10 the end walls 28 and 30 of the cylindrical foot member and the tubular body are in general contact with the respective abutting shoulders 18 and 24.

The tubular steel body 10 and cast iron foot member 12, when joined by the method of this invention, are preferably first degreased in any suitable manner, as by means of an alkali cleaner or other suitable solvent. After degreasing, the articles, if severely rusted or scaled, are preferably pickled in a water solution of hydrochloric acid in the known and accepted manner of such acid cleaning. After pickling a flux such as one composed of 85 parts of sodium tetraborate pentahydrate, 15 parts of sodium carbonate and 50 parts of water, all measurements by weight, may be applied to the article. The foregoing flux is given as a typical example of a borax type flux which may be used. After applying the flux just described, the articles are suitably assembled, as shown in FIGURE 2, in a close-fitting structural relationship.

The assembly is then placed within an induction coil heater and positioned therein in such a manner that heat is directly applied only to the tubular steel body 10. Thus, heating of the foot member or end cap 12 is attained primarily through conduction of heat from the heated area 32 of the steel tubular body 10. In this manner a temperature gradient is formed between the end cap and the directly heated area 32 of the tubular body 10. Sufficient heat is applied to the tubular body to form a temperature gradient wherein substantially only the bonding interface 34 of the foot member 12 is raised to about its melting point. At about the melting point of the cast iron, it diffuses into the steel and alloys therewith to form an alloy bond to secure the end cap to the tubular body. After a sufficient gradient has been established the heating is terminated and the assembly is allowed to cool. The bonding interface will have a diffusion alloy layer 34, such as shown in FIGURE 3, between the two connected members 10 and 12 joining the two metal parts to form the composite valve lifter body shown in FIGURE 4. Thereafter, if desired, the composite valve lifter body can be further treated, such as by machining, heat treatment, etc., to provide the most suitable exterior surface on the finished composite part.

Although bonding of the cast iron and steel can be effected by this invention in an oxidizing atmosphere such as air, an objectionable scaling of the exterior surface of the parts may occur. To avoid this surface oxidation it is preferred to practice this invention in a non-oxidizing atmosphere when joining highly corrosive metals. Thus, it is advantageous to heat such metals in an atmosphere of argon, hydrogen, nitrogen, carbon dioxide, carbon monoxide or the like. Particularly successful results have been obtained with an argon atmosphere.

Any form of heating can be used to practice this invention provided it can be applied in such a manner that the higher melting point metal, such as the steel article, is directly preferentially heated. This invention can be practiced most efficiently when employing a form of heating which can be directed to a localized area. Such heating can be concentrated at an area of the higher melting point metal immediately adjacent the bonding joint yet be so controlled that substantially no direct heating of the lower melting point metal occurs. Thus, in many instances, induction heating or flame heating is preferably used. In some instances, however, other forms of heating, such as by means of a molten salt bath or the like, can be effectively employed. Generally, any form of heating can be used which will form a sufficient temperature gradient between the heated surface and the lower melting point article so that substantially only the bonding surface of the lower melting point metal becomes molten or attains a diffusion alloying temperature.

The lower limit of the temperature range to which the higher melting point metal article is heated depends primarily upon the melting point of the metal article to which it is to be bonded. Generally, to obtain a satisfactory bonding it is desirable to heat the higher melting point metal to a high enough temperature that the lower melting point metal is liquefied at the bonding interface. Melting of the bonding surface of the lower melting point metal is usually preferred to obtain the strongest bond since maximum diffusion alloying usually occurs under this condition. The upper limit of heating temperature is dependent upon the melting point of the higher melting point metal article and the temperature gradient formed during the heating. The preferred temperature to which the higher melting point article is raised during the bonding operation will therefore lie between the melting points of the two articles and be more precisely determined by the thermal conductivity of the higher melting point article, the distance of the directly heated area from the bonding interface, the nature of the physical contact of the bonding surfaces, etc. The distance of the directly heated area of the higher melting point metal from the bonding surface can be varied, but the invention is most advantageously practiced when this area is closely adjacent the bonding interface. In this manner less heat need be supplied to form the required temperature gradient, and a more even conduction of heat to the bonding area can be effected to precisely control the temperature gradient.

When making a composite valve lifter body, such as described above, from a plain carbon tubular steel member having an outer diameter of about 0.84 inch and an inner diameter of about 0.63 inch, the following specific method has proved to be satisfactory. The steel body is joined to a cast iron end cap, such as shown in the figures, the cast iron having a composition comprising approximately by weight:

|  | Percent |
| --- | --- |
| Carbon | 3–3.25 |
| Manganese | 0.7–9 |
| Phosphorus | 0.20 maximum |
| Sulfur | 0.10 maximum |
| Silicon | 2.1–2.4 |
| Nickel | 0.40–0.70 |
| Chromium | 0.90–1.1 |
| Molybdenum | 0.40–0.70 |
| Iron | Balance |

The steel, being a plain carbon type, such as SAE 1020 steel, has a melting point of approximately 2700° F., while the cast iron melts at approximately 2000° F. to 2100° F. The steel tubular body and the end cap, if not rusted, are merely degreased in a known and acceptable manner in an organic solvent, such as trichloroethylene or the like. However, if rusted or scaled, a suitable descaling or pickling treatment may be necessary to produce a satisfactory bond. The tubular body has a counterbore at one end, as hereinbefore described, to receive the end cap reducing the wall thickness of the tubular body in the interfacial bonding area to approximately 1/16 inch. The cast iron end cap is inserted into the enlarged bore of the tubular body in close-fitting structural relationship thereto. The assembly is then placed in a 20 kilowatt, 450 kilocycle single turn induction heating coil, for example, made from 1/4 inch diameter copper tubing. The assembly may be positioned within the coil substantially as shown in FIGURE 2. Thus, the area of the steel cylinder which is directly heated is immediately below the exposed end cap and is in radial alignment with the segment of the end cap within the enlarged bore of the tubular body.

The steel cylinder is heated in an argon atmosphere for approximately 40 seconds in order to form the required temperature gradient in which the heated area of the steel cylinder is raised to a temperature of about 2100° F. The 40-second heating period raises the temperature of the cast iron to its melting point but only to a predetermined depth below its surface, thereby permitting substantially the entire cast iron end cap to remain in a solid state and retain the physical properties produced by the original casting conditions. After the heating is terminated, the assembly is cooled to thereby produce a strong bond between the joined parts.

Although the method of the present invention has been described in connection with specific examples of cast iron and steel, it is considered equally applicable to the joining of any two metals which are metallurgically compatible. Such metals can be bonded quite readily by liquefying one and applying it to the surface of the other since they are mutually soluble and the metal which is molten is capable of wetting the surface of the other solid metal. Due to this metallurgical compatibility, a diffusion or alloying occurs at the interface of the two metals. Mutual diffusion of the respective metals forms a strong bond between the two metals at the interface, thus causing the subsequently solidified liquid metal to securely adhere to the other solid metal part. Joining of the two metals in this manner, of course, requires that the metals have significantly different melting points so that one can be heated substantially above the melting point of the other before melting itself. This melting point temperature difference is required as a practical necessity, and obviously the minimum difference will vary according to the materials being united, the nature of the heating employed, the distance of the treated area of the higher melting point metal from the bonding interface, the thermal conductivity of the higher melting point, etc. Hence, the minimum required difference will vary for each specific application of the invention. Generally, however, the invention can be practiced quite readily when this difference is at least 300° F.

It is to be understood that although the present invention has been described in connection with certain specific examples thereof, no limitation is intended thereby except as defined by the appended claims.

We claim:

1. A method of making a composite body for an internal combustion engine valve lifter, said method comprising the steps of assembling a tubular steel body member and a cast iron end cap for said tubular member, said end cap having a reduced diameter portion forming an annular shoulder thereon, positioning the reduced diameter portion of said end cap within said tube so as to abut said shoulder against the end of the tube, said reduced diameter portion of said end cap and the inner surface of said tube being closely fitted together, preferentially heating an area of said tubular member in such a manner as to principally conductively heat said end cap through points of contact with said tubular member, applying said heat to said tubular member to form a temperature gradient between the tubular member and the end cap at all points of contact wherein said end cap melts substantially only at said points of contact, terminating said heating and cooling said tubular body and said end cap while maintaining same in structural relationship.

2. A method of making a composite body for an internal combustion engine valve lifter, said method comprising the steps of assembling a tubular steel body member and a cast iron end cap for said tubular member, said end cap having a reduced diameter portion forming an annular shoulder thereon, positioning the reduced diameter portion of said end cap within said tube so as to abut said shoulder against the end of the tube, said reduced diameter portion of said end cap and the inner surface of said tube being closely fitted together, preferentially heating in a non-oxidizing atmosphere an area of said tubular member in such a manner as to principally conductively heat said end cap through points of contact with said tubular member, applying said heat to said tubular member to form a temperature gradient between the tubular member and the end cap at all points of contact wherein said end cap melts substantially only at said points of contact, terminating said heating and cooling said tubular body and said end cap while maintaining same in structural relationship.

3. A method of making a composite body for an internal combustion engine valve lifter, said method comprising the steps of assembling a tubular steel body member and a cast iron end cap for said tubular member, said end cap having a reduced diameter portion forming an annular shoulder thereon, positioning the reduced diameter portion of said end cap within said tube so as to abut said shoulder against the end of the tube, said reduced diameter portion of said end cap and the inner surface of said tube being closely fitted together, preferentially inductively heating an area of said tubular body which is in radial alignment with said reduced diameter portion of said end cap within said tubular body, said induction heating being applied to form a temperature gradient between said tubular member and said end cap at all points of mutual contact wherein said end cap attains a temperature of approximately 2100° F. substantially only at said points of contact, terminating said heating and cooling said tubular body and said end cap while maintaining same in structural relationship.

References Cited in the file of this patent

UNITED STATES PATENTS

| | | |
|---|---|---|
| 1,691,778 | McDonald | Nov. 13, 1928 |
| 1,745,886 | Bissell et al. | Feb. 4, 1930 |
| 2,397,308 | Barnes | Mar. 26, 1946 |
| 2,653,210 | Becker | Sept. 22, 1953 |
| 2,798,141 | Longacre | July 2, 1957 |

FOREIGN PATENTS

| | | |
|---|---|---|
| 286,823 | Great Britain | Mar. 15, 1928 |